United States Patent [19]
Masuo et al.

[11] Patent Number: 6,154,444
[45] Date of Patent: Nov. 28, 2000

[54] SOURCE ROUTING METHOD FOR FAST CONNECTION RE-ESTABLISHMENT IN RESPONSE TO EARLY-ARRIVING TROUBLE REPORT MESSAGES

[75] Inventors: Hitoshi Masuo; Atsushi Iwata, both of Tokyo, Japan

[73] Assignee: NEC Corporation, Tokyo, Japan

[21] Appl. No.: 08/958,529

[22] Filed: Oct. 27, 1997

[30] Foreign Application Priority Data

Oct. 25, 1996 [JP] Japan .................................... 8-301362

[51] Int. Cl.[7] .................................................. G01R 31/08
[52] U.S. Cl. .......................... 370/225; 370/242; 370/243
[58] Field of Search .................................... 370/395, 396, 370/400, 410, 242, 245, 248, 432, 243, 244; 709/224, 226, 227, 228, 229, 238, 339, 240, 241; 714/1, 2, 3, 4

[56] References Cited

U.S. PATENT DOCUMENTS

| | | | |
|---|---|---|---|
| 5,115,495 | 5/1992 | Tsuchiya et al. | 395/200 |
| 5,638,516 | 6/1997 | Duzett et al. | 395/200.15 |
| 5,649,108 | 7/1997 | Spiegel et al. | 395/200.12 |
| 5,835,482 | 11/1998 | Allen | 370/225 |
| 5,854,899 | 12/1998 | Callon et al. | 395/200.68 |
| 5,881,246 | 3/1999 | Crawley et al. | 395/200.68 |
| 5,940,372 | 8/1999 | Bertin et al. | 370/238 |
| 5,948,069 | 9/1999 | Kitai et al. | 709/240 |

FOREIGN PATENT DOCUMENTS

| | | |
|---|---|---|
| 4-311127 | 11/1992 | Japan . |
| 5-14396 | 1/1993 | Japan . |
| 5-268240 | 10/1993 | Japan . |

OTHER PUBLICATIONS

Private Network–Network Interface Specification Version 1.0 (PNNI 1.0), ATM Forum, Technical Committee, Mar. 1996, pp. 13–46.

Atsushi Iwata et al., "QOS Routing Algorithm for ATM Networks with Multiple Quality of Service Requirements", *Technical Report of IEICE*, SSE95–126, Dec. 1995, pp. 7–12.

Atsushi Iwata et al., "QOS Routing Algorithms for ATM Networks with Multiple Quality of Service Requirements", *Proceedings of the 1996 IEICE General Conference*, Mar. 1996, p. 221.

*Primary Examiner*—Wellington Chin
*Assistant Examiner*—Enrique L Santiago
*Attorney, Agent, or Firm*—Sughrue, Mion, Zinn, Macpeak & Seas, PLLC

[57] ABSTRACT

In a connection-oriented network, a route table and a network resource table are provided in a source node which updates the network resource table in response to a topology state message which is flooded through the network whenever there is a change in the available network resources. The source node updates the network resource table in response to an early-arriving trouble report message from the network if such a change in the available network resources occurs when a connection is being progressively established or already established from the source node. In response to a connection setup message, the source node fetches a route from the route table and compares a user's requirement such as quality and/or bandwidth with the resource data of the fetched route stored in the network resource table. A connection is established via the fetched route if the resource data of the fetched route in the network resource table indicates that the fetched route can support the requirement.

17 Claims, 7 Drawing Sheets

FIG. 3A
ROUTE TABLE

| SOURCE NODE 1 | DESTINATION NODE | | | | |
|---|---|---|---|---|---|
| | 2 | 3 | 4 | 5 | 6 |
| | 1→2 | 1→3 | 1→2→4 | 1→2→5 | 1→2→4→6 |

FIG. 3B
NETWORK RESOURCE TABLE (BANDWIDTH)

| NODE \ NODE | 1 | 2 | 3 | 4 | 5 | 6 |
|---|---|---|---|---|---|---|
| 1 | | 100 | 70 | — | — | — |
| 2 | 100 | | — | 90 | 50 | — |
| 3 | 70 | — | | 80 | 40 | — |
| 4 | — | 90 | 80 | | 40 | 150 |
| 5 | — | 50 | 40 | — | | 100 |
| 6 | — | — | — | 150 | 100 | |

FIG. 4

FIG. 5A
ROUTE TABLE

| SOURCE NODE 1 | DESTINATION NODE | | | | |
|---|---|---|---|---|---|
| | 2 | 3 | 4 | 5 | 6 |
| | 1→2 | 1→3 | 1→2→4 | 1→3→5 | 1→2→4→6 |

FIG. 5B
NETWORK RESOURCE TABLE (BANDWIDTH)

| | NODE | | | | | |
|---|---|---|---|---|---|---|
| NODE | 1 | 2 | 3 | 4 | 5 | 6 |
| 1 | | 100 | 70 | — | — | — |
| 2 | 100 | | — | 90 | 50 | — |
| 3 | 70 | — | | 80 | 40 | — |
| 4 | — | 90 | 80 | | — | 150 |
| 5 | — | 50 | 40 | — | | 100 |
| 6 | — | — | — | 150 | 100 | |

FIG. 5C
TIMED RESOURCE TABLE

| ROUTE | 1→2 | 1→3 | 1→2→4 | 1→3→5 | 1→2→4→6 |
|---|---|---|---|---|---|
| BANDWIDTH | 20 | — | — | — | — |
| TIME | 15:00 | — | — | — | — |

FIG. 6

FIG. 7A
WORKING ROUTE TABLE

| | | DESTINATION NODE | | | | |
|---|---|---|---|---|---|---|
| | | 2 | 3 | 4 | 5 | 6 |
| SOURCE NODE 1 | | 1→2 | 1→3 | 1→2→4 | 1→3→5 | 1→2→4→6 |

FIG. 7B
SPARE ROUTE TABLE

| | | DESTINATION NODE | | | | |
|---|---|---|---|---|---|---|
| | | 2 | 3 | 4 | 5 | 6 |
| SOURCE NODE 1 | | 1→3→5→2 | 1→2→4→3 | 1→3→4 | 1→2→5 | 1→3→5→6 |

FIG. 7C
NETWORK RESOURCE TABLE (BANDWIDTH)

| | | | | NODE | | | |
|---|---|---|---|---|---|---|---|
| | | 1 | 2 | 3 | 4 | 5 | 6 |
| NODE | 1 | \ | 100 | 70 | — | — | — |
| | 2 | 100 | \ | — | 90 | 50 | — |
| | 3 | 70 | — | \ | 80 | 40 | — |
| | 4 | — | 90 | 80 | \ | — | 150 |
| | 5 | — | 50 | 40 | — | \ | 100 |
| | 6 | — | — | — | 150 | 100 | \ |

FIG. 7D
TIMED RESOURCE TABLE

| ROUTE | 1→2 | 1→3 | 1→2→4 | 1→3→5 | 1→2→4→6 |
|---|---|---|---|---|---|
| BANDWIDTH | 20 | — | — | — | — |
| TIME | 15:00 | — | — | — | — |

FIG. 8

SOURCE ROUTING METHOD FOR FAST CONNECTION RE-ESTABLISHMENT IN RESPONSE TO EARLY-ARRIVING TROUBLE REPORT MESSAGES

BACKGROUND OF THE INVENTION

1. Field of the Invention

The present invention relates generally to connection-oriented networks such as ATM (asynchronous transfer mode) networks, and more specifically to a source routing method for fast re-establishment of connections when source user's demand is not supported when a connection is being established or already established.

2. Description of the Related Art

In a connection-oriented network where the source routing scheme is employed, connection setup is performed on a distributed management basis by having network nodes autonomously exchange topological state data so that they maintain an identical topology data base. Private Network-Network Interface Specification Version 1.0 (PNNI 1.0), ATM Forum, Technical Committee, March 1996, page 17, describes a "flooding procedure" in which topology state packets are flooded through a network to update topology database of each network node. The flooding topology state message is transmitted from one node to all neighbor nodes on a hop-by-hop basis with the neighbor nodes returning acknowledgment messages. As a result, the flooding message takes time to reach distant nodes away from the point of origin. Therefore, in a connection-oriented network where source routing is employed, it takes time for a source node to reestablish a connection in the event of a network failure if the flooding message is used solely as a fault recovery mechanism.

SUMMARY OF THE INVENTION

It is therefore an object of the present invention to provide a source routing method for quickly establishing a connection in a connection-oriented network when the connection encounters an unfavorable network condition.

This object is attained by having a source node of a communication network respond to trouble report messages which arrive earlier than event report messages flooded through the network.

According to a first aspect of the present invention, there is provided a source routing method for routing a call from a source node through a communication network in which a plurality of nodes are interconnected by communication links, wherein the source node is provided with a route table and a network resource table, the route table storing data of a plurality of routes from each of the nodes to other nodes of the network, and the network resource table storing data of available network resources of the links. The source routing of the source node comprises updating the network resource table in response to a first message received from the network whenever there is a change in the available network resources, the first message being flooded through the network to exchange most recent resource data among the nodes. The source node updates the network resource table in response to a second message from the network if the change in the available network resources occurs when a connection is being progressively established or already established from the source node, the second message arriving at the source node earlier than the first message. The source node responds to a connection setup message from a user terminal for fetching a route from the route table and compares a requirement such as quality and/or bandwidth requested by the user terminal with the resource data of the fetched route stored in the network resource table. A connection is established via the fetched route if the resource data of the fetched route in the network resource table indicates that the fetched route can support the user's requirement.

According to a second aspect, the source routing method of the present invention is intended for routing a call from a source node through a communication network in which a plurality of nodes are interconnected by communication links, wherein the source node is provided with a route table, a network resource table and a timed resource table, the route table storing data of a plurality of routes from each of the nodes to other nodes of the network, the network resource table storing data of available network resources of the links, wherein contents of the timed resource table are valid for a predefined duration. The source routing method comprises updating the network resource table in response to a first message received from the network whenever there is a change in the available network resources, the first message being flooded through the network to exchange most recent resource data among the nodes. The timed resource table is updated in response to a second message from the network if the change in the available network resources occurs when a connection is being progressively established or already established from the source node so that data of most recent resource of a route of the connection is installed in the timed resource table, wherein the second message arrives at the source node earlier than the first message. In response to a connection setup message from a user terminal the source node fetches a route from the route table and compares the user's requested requirement with the resource data of the fetched route stored in the timed resource table if the valid contents of the timed resource table are relevant to the fetched route or compares the user's requirement with the resource data of the fetched route stored in the network resource table if the contents of the timed resource table are invalid or the valid contents of the timed resource table are irrelevant to the fetched route. A connection is established via the fetched route if the resource data of the fetched route in either the timed resource table or the network resource table indicates that the fetched route can support the user's requirement.

According to a third aspect, the source routing method of this invention is intended for routing a call from a source node through a communication network in which a plurality of nodes are interconnected by communication links, wherein the source node is provided with a working route table, a spare route table, a network resource table and a timed resource table, the working route table storing data of a plurality of working routes from each of the nodes to other nodes of the network, the spare route table storing a plurality of spare routes from each of the nodes to the other networks, the network resource table storing data of available network resources of the links, wherein contents of the timed resource table are valid for a predefined duration. The source routing method of the source node comprises updating the network resource table in response to a first message received from the network whenever there is a change in the available network resources, the first message being flooded through the network to exchange most recent resource data among the nodes. The source node updates the timed resource table in response to a second message from the network if the change in the available network resources occurs when a connection is being progressively established or already established from the source node so that data of most recent resource of a route of the connection is installed in the timed resource table, the second message arriving at the source node earlier than the first message. The source node fetches a working route from the working route table in response to a connection setup message from a user terminal. The user's requested requirement is compared with the resource data of the timed resource table if the valid contents of the timed resource table are relevant to the fetched working route, or compared with the resource data of the fetched working route stored in the network resource table if the contents of the timed resource table are invalid or the valid contents of the timed resource table are irrelevant to the fetched working route. A spare route is fetched from a spare route from the spare route table if the resource data of the fetched working route stored either in the timed resource table or the network resource table indicates that the fetched working route does not support the user's requirement. The user's requirement is then compared with the source data of the fetched spare route of the network resource table. A connection is established via the fetched working route if the resource data of the fetched working route in either the timed resource table or the network resource table indicates that the fetched working route can support the user's requirement, or via the fetched spare route if the resource data of the fetched spare route in the network resource table indicates that the fetched spare route can support the user's requirement.

BRIEF DESCRIPTION OF THE DRAWINGS

The present invention will be described in further detail with reference to the accompanying drawings, in which.

DETAILED DESCRIPTION

Figures 1, 2:
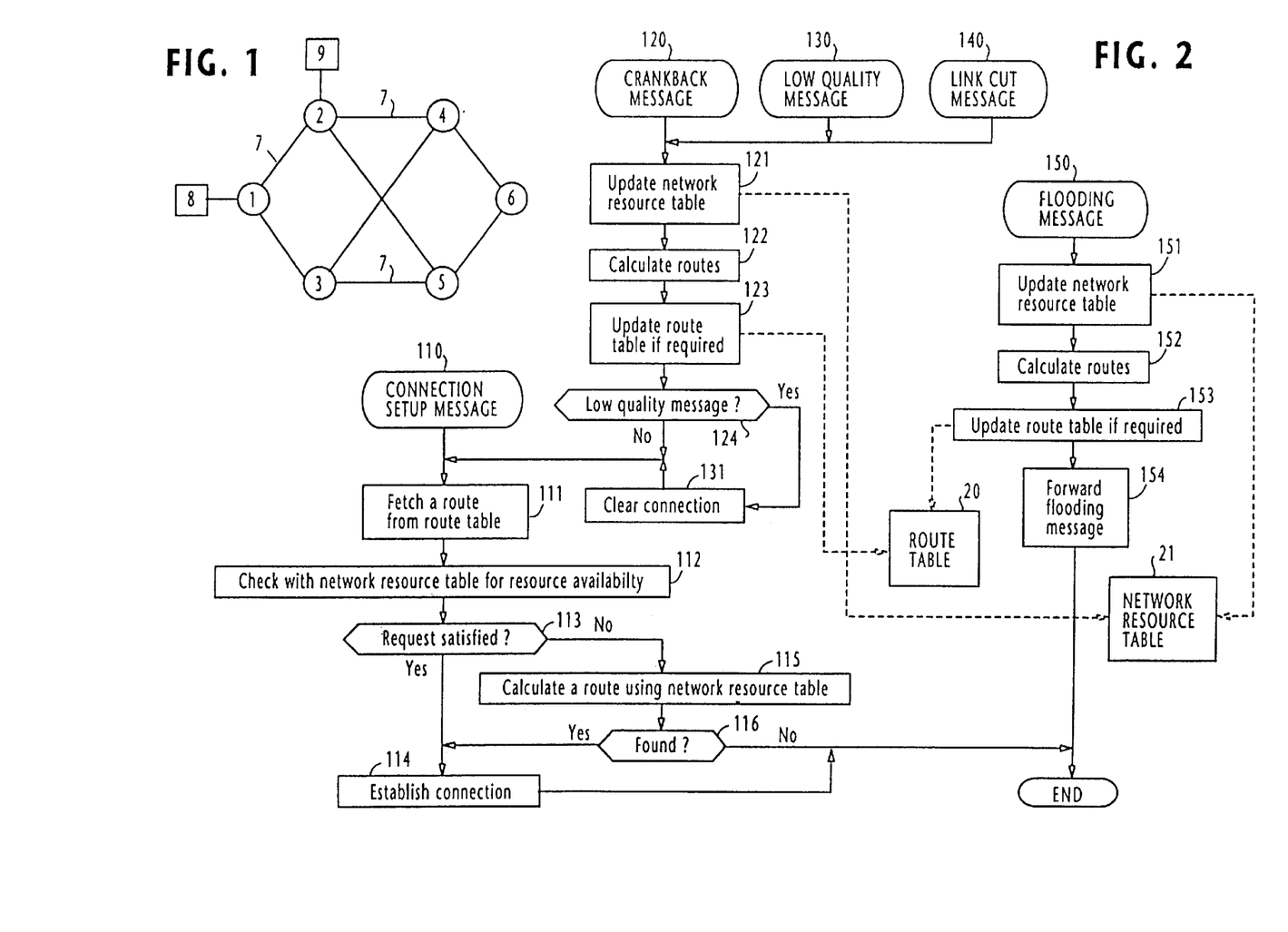
FIG. 1 is a block diagram of a typical ATM network in which the present invention is embodied.
FIG. 2 is a flowchart of the operation of a source node according to a first embodiment of the present invention.

In FIG. 1, a typical ATM (asynchronous transfer mode) network comprises ATM nodes 1 to 6 interconnected by communication links 7. User terminals 8 and 9 are shown connected to ATM nodes 1 and 2, respectively. When user terminal 8 sends a connection setup message to the serving node 1 for establishing a connection to user terminal 9, the node 1 initiates a connection setup routine.

FIG. 2 illustrates a source routing algorithm according to a first embodiment of the present invention in which a route table 20 and a network resource table 21 are provided in a source node. The route table 20 stores a map defining the relationships between all possible candidate routes from the source node to every other nodes and corresponding sets of concatenated nodes. The network resource table 21 defines a map in which quality-of-service (QOS) parameters and available bandwidths (expressed in transmission speed, or Mbps) and link costs between all possible combinations of network nodes are stored in a matrix of rows and columns.

When a connection setup message is received from user terminal 8 (step 110), node 1 proceeds to step 111 to fetch a route from the route table 20. At step 112, the source node checks with the network resource table 21 to determine whether or not all links of the route support the QOS and/or bandwidth requested by the originating terminal 8 by comparing the requested user values with the available network resource values of the fetched route stored in the table 21. If it is determined that the request is satisfied (step 113), flow proceeds to step 114 to establish a connection to the destination terminal 9 via the fetched route. Otherwise, the source node calculates a new route using the network resource table 21 (step 115). The route calculation is an iterative process of finding a candidate route using topological resource data in the network resource table and checking the user's request with the available resource of each link of the candidate route. If this process is successful, control is directed down the affirmative branch from step 116 to the connection setup step 114. If no route is found that satisfies the user's request, control is directed down the negative decision branch from step 116 to the end of the program.

Because of changes in resource availability due to additional calls which have been placed since the route information was produced or due to a link failure, there is a likelihood of a call encountering a situation in which the requested parameters cannot be supported. If this is the case, the call is cranked back to an intermediate node with an indication of the problem. This node may choose an alternate path over which to progress the call or may further crankback the call. In the worst case, the call may be cranked back to the source node, and the source node receives a crankback message with an indication of the problem (step 120). Flow proceeds to step 121 to update the network resource table 21 with data contained in the crankback message indicating an amount of available resource remaining in the affected route. The source node then proceeds to step 122 to provide route calculations using the indicated remaining available resource data and updates the route table 20 if required (step 123). If the fetched route is seriously affected to such a degree that a connection of any quality and/or bandwidth cannot be secured, the source node updates the route table 20 according to the calculated routes.

When a call is in progress, the source node may receive a low quality message from a node with an indication of unavailable resource due to the allocation of bandwidth to higher priority calls (step 130) and a link cut message if any link of the connection is shutdown (step 140). In either case, steps 121 to 123 are executed using the data which the received messages contain.

At step 124, source node determines whether the received message is low quality message. If so, node 1 proceeds to step 131 to clear the connection and proceeds to step 111. If the received message is crankback message or link cut message, the decision at step 124 is negative and flow proceeds to step 111.

In either case, steps 111 and 112 are looped and a new route is fetched using the updated route table 20 to reestablish a connection (step 113). If a low quality message has been received, the decision at step 124 is affirmative and flow proceeds to step 131 to clear the connection and then steps 111 to 113 are executed to reestablish a connection via the new route.

The resource of the network may change over time. In order to maintain an identical resource database, a mechanism known as "flooding" is used to advertise a new event in the network resource from each node to all neighbor nodes.

When the source node receives a topology state message, or "flooding" message from the network with an indication of a new event in the network resource (step 150), the source node proceeds to step 151 to update the network resource table 21 according to the indication of the flooding message. At step 152, new routes are calculated using the flooding message, and the route table 20 is updated with the calculated routes if required (step 153) and flow proceeds to step 154 to forward the flooding message to neighbor nodes. If any link of the network is so seriously affected that it requires rerouting of any call, the route table 20 will be updated at step 153.

Since the network resource table 21 is updated with the crankback message, low quality message and link cut message which arrive at the source node earlier than flooding messages, any changes in the network resource can be reflected in the rerouting calculations before a flooding message arrives. Therefore, a connection that supports the requested quality/bandwidth requirements can be reestablished quickly over a new route in the event of a failure.

Figure 3A:
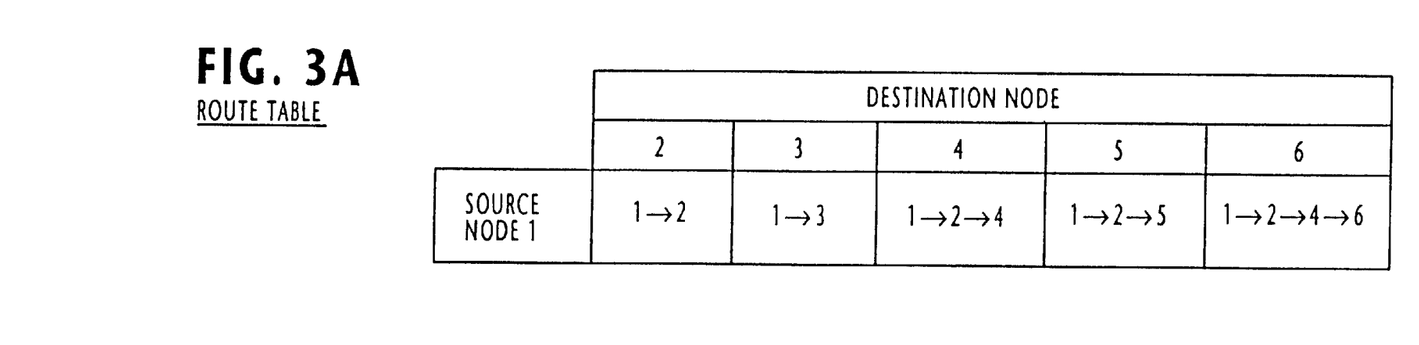
FIGS. 3A and 3B are illustrations of a route table and a network resource table used in the first embodiment, respectively.
Figure 3B:
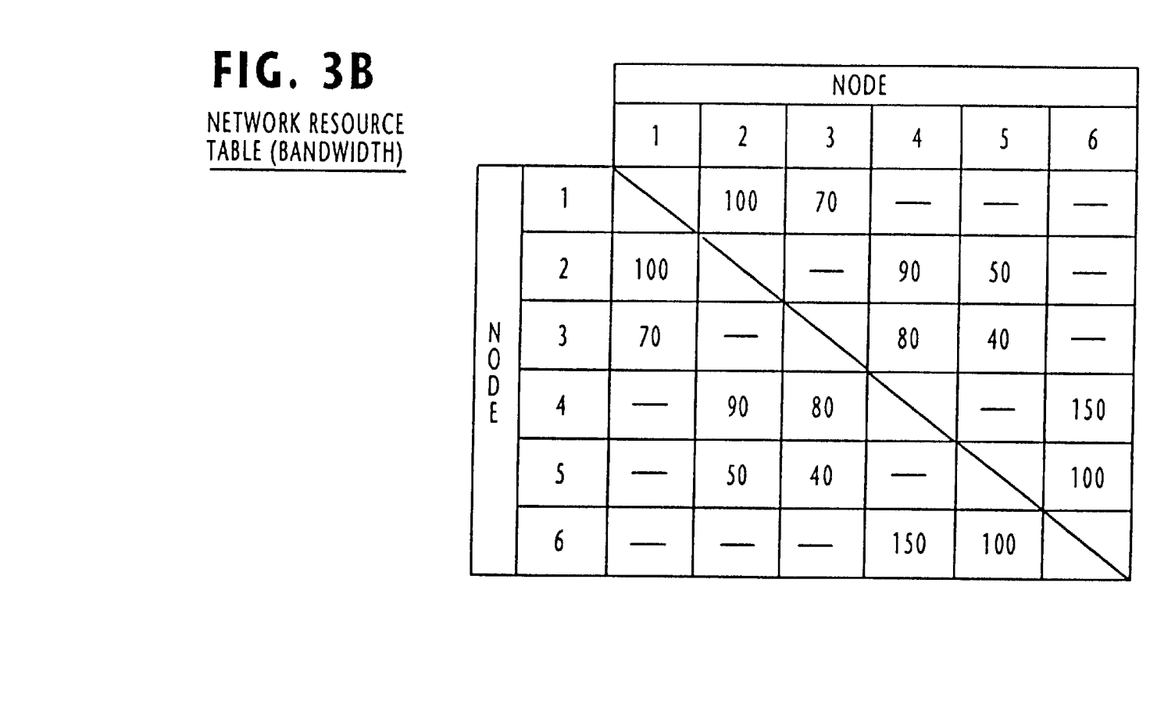

The operation of the source node according to the flowchart of FIG. 2 will be best understood with the following description by assuming that the originating user terminal 8 requests a connection to user terminal 9 with a bandwidth of 50 Mbps and that the contents of route table 20 and network resource table 21 are as shown in FIGS. 3A and 3B, respectively.

In response to a connection message from the originating user 8, the source node 1 fetches, at step 211, a route between nodes 1 and 2 from the route table 20 (FIG. 3A) and checks with the network resource table 21 for availability of the requested bandwidth (step 112). Since the fetched route can support 100 Mbps, the decision at step 113 is affirmative and a connection is established between nodes 1 and 2 (step 114). If a crankback message is received during the connection setup procedure (step 120), indicating that available resource of the route between nodes 1 and 2 is only 45 Mbps, the source node updates network resource table 21 by rewriting the bandwidth entry from node 1 to node 2 with a 45-Mbps value (step 121). Since the route between nodes 1 and 2 is not seriously affected and still can support a request of narrower bandwidth, the route table 20 is not updated. Thus, flow proceeds to step 111. However, since there is only one optimum route stored in the route table 20 for connections between nodes 1 and 2, the previously fetched route is fetched again and determined that it cannot support the user's request (steps 112, 113). Flow proceeds to step 115 to calculate a new route to the destination user via nodes 1, 3, 4 and 2 using the updated network resource table 21 and the user's requested bandwidth. A connection is therefore reestablished over the new route. It is seen from FIG. 3B that the calculated new route can support the requested bandwidth. The source node will successfully complete a connection re-establishment before it receives a flooding message.

Figure 4:
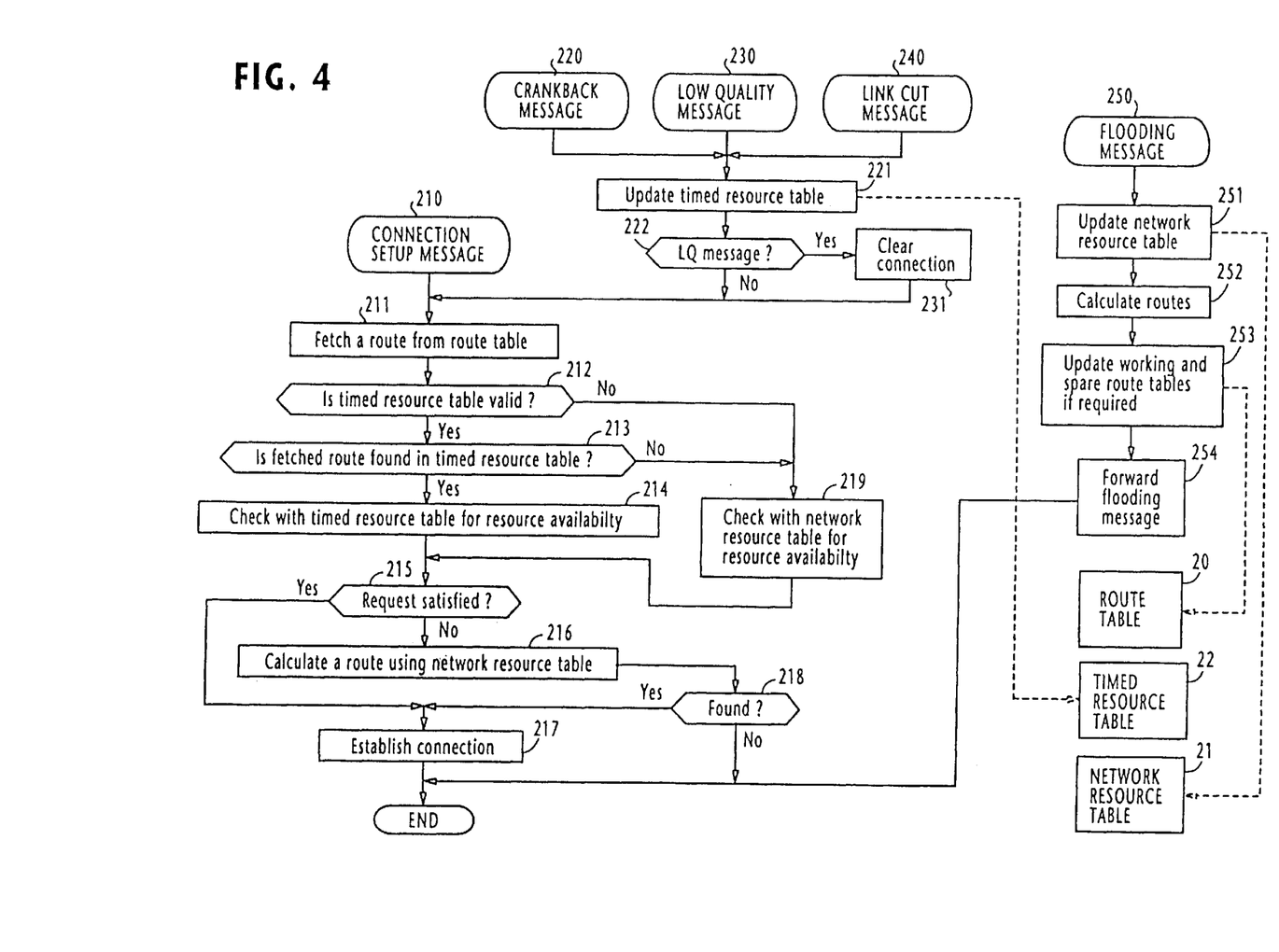
FIG. 4 is a flowchart of the operation of a source node according to a second embodiment of the present invention.

FIG. 4 shows a flowchart of the operation of the source node according to a second embodiment of this invention in which parts corresponding in significance to those in FIG. 2 are marked with the same numerals as those in FIG. 2, the description thereof being omitted for simplicity. According to the second embodiment, a timed resource table 22 is additionally provided in the source node for storing network resource data reported by a crankback message, a low quality message and a link cut message when the resource of the route of interest is affected by traffic or other causes. The data in the timed resource table 22 is valid until it times out when a predetermined length of time has elapsed from the time it is updated.

When a connection setup message is received (step 210), the source node fetches a route from the route table 20 (step 211) and checks to see if the data stored in the timed resource table 22 is valid or not (step 212). If the stored data is valid, flow proceeds to step 213 to check to see if the fetched route is found in the timed resource table 22. If so, the source node determines, at step 214, whether the value stored in the timed resource table is sufficient to support the requested QOS and/or bandwidth. If this is the case, the user's request is satisfied and step 215 yields an affirmative decision, which is followed by step 216 to establish a connection.

If the decision at step 215 is negative, the source node calculates a new route using the network resource table at step 216. If an appropriate route is found (step 218), control proceeds to the connection establishment step 216. Otherwise, the program execution is terminated. If the data in the timed resource table 22 has been timed out and hence it is invalid (step 212) or the fetched route is not found in the timed resource table (step 213), flow proceeds to step 219 where the source node checks with the network resource table 21 for resource availability of the fetched route to determine whether it meets the user's request in the same manner just described.

If a crankback message is received when a call is being established, or if a low quality message or a link cut message is received when a call is in progress (step 220, 230 or 240), the source node proceeds to step 221 to store the received resource data of an affected route into the timed resource table 22 or updates its contents if present, and sets the time of arrival of the message. Flow proceeds to step 222 to check to see if the received message is low quality message.

If the received message is either a crankback message or a link cut message, the decision at step 222 is negative and flow proceeds from step 222 to step 211. If the received message is low quality message, the decision at step 222 is affirmative and flow proceeds to step 231 to clear the connection and proceeds to step 211. If any of these unfavorable messages is of recent origin, the data in timed resource table 22 is valid and step 211 yields an affirmative decision. Therefore, the source node executes steps 212 to 216 to reestablish a connection before it receives a flooding message.

If a connection setup message is received before the table 22 times out and if the fetched route is found in this table, the source node uses this table to check for resource availability. However, if a connection setup message is received after the table 22 times out, the source node recognizes that there is no unfavorable situation in the network and uses the network resource table 21 to check for resource availability.

The operation of the source node according to the flowchart of FIG. 4 will be understood with the following description by assuming that the originating user terminal 8 sends a connection message destined for user terminal 9 requesting a bandwidth of 50 Mbps immediately after the source node 1 has received a crankback message indicating that the route via node 1 to node 2 has a bandwidth of only 20 Mbps. Example data stored in the route table 20, network resource table 21 and timed resource table 22 are shown in FIGS. 5A, 5B and 5C, respectively.

Figure 5A:
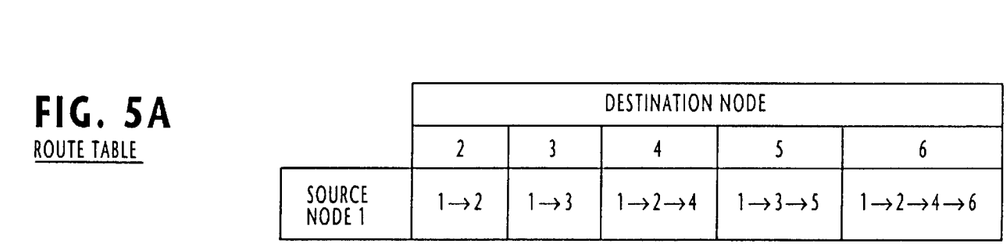
FIGS. 5A, 5B and 5C are illustrations of a route table, a network resource table and a timed resource table respectively used in the second embodiment.
Figure 5B:
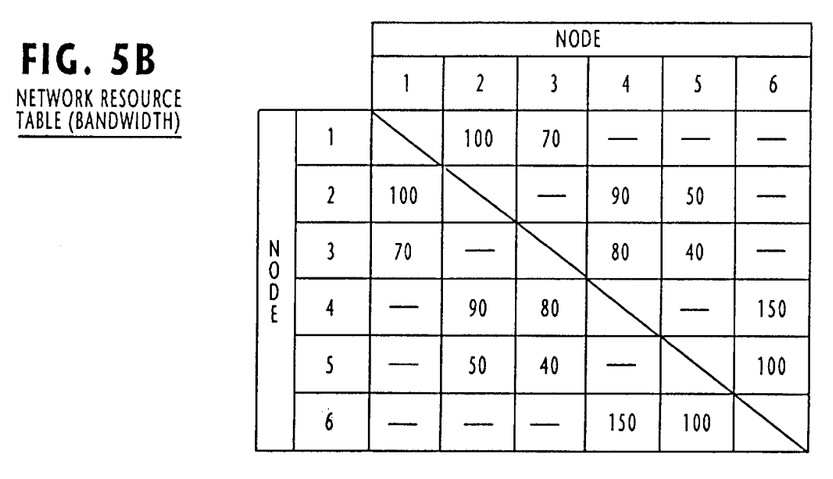
Figure 5C:
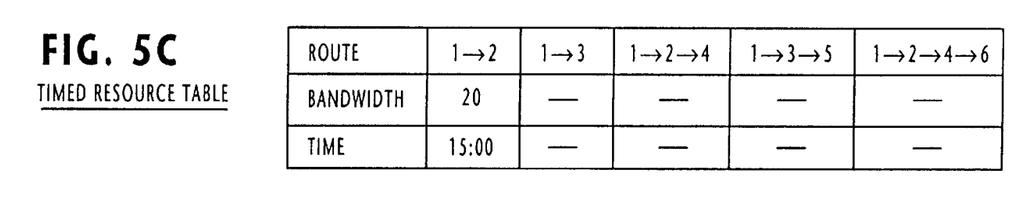

In response to the connection message, the source node 1 fetches, at step 211, the optimum route via node 1 to node 2 from the route table 20 (FIG. 5A). Since the data in the timed resource table 22 is valid (step 212) and the route from node 1 to node 2 is found in the timed resource table 22 (step 213), the source node checks with this table for availability of the requested bandwidth (step 214). Since the available bandwidth of the fetched route is only 20 Mbps as indicated in FIG. 5C, the decision at step 215 is negative, and the source node calculates a new route via nodes 1, 3, 4 and 2, at step 217, using the network resource table 21 (which was already updated in response to the crankback message). If an appropriate route is found (step 218), a connection is established between nodes 1 and 2 over the new route (step 216). It is seen from FIG. 5B that the calculated new route via nodes 1, 3, 4 and 2 can support the requested bandwidth of 50 Mbps. In this way, the source node will successfully complete a connection setup before it receives a flooding message. If the bandwidth of the user's request is equal to or narrower than 20 Mbps, control will be directed down the affirmative decision branch from step 215 to the connection establishment step 216.

Figure 6:
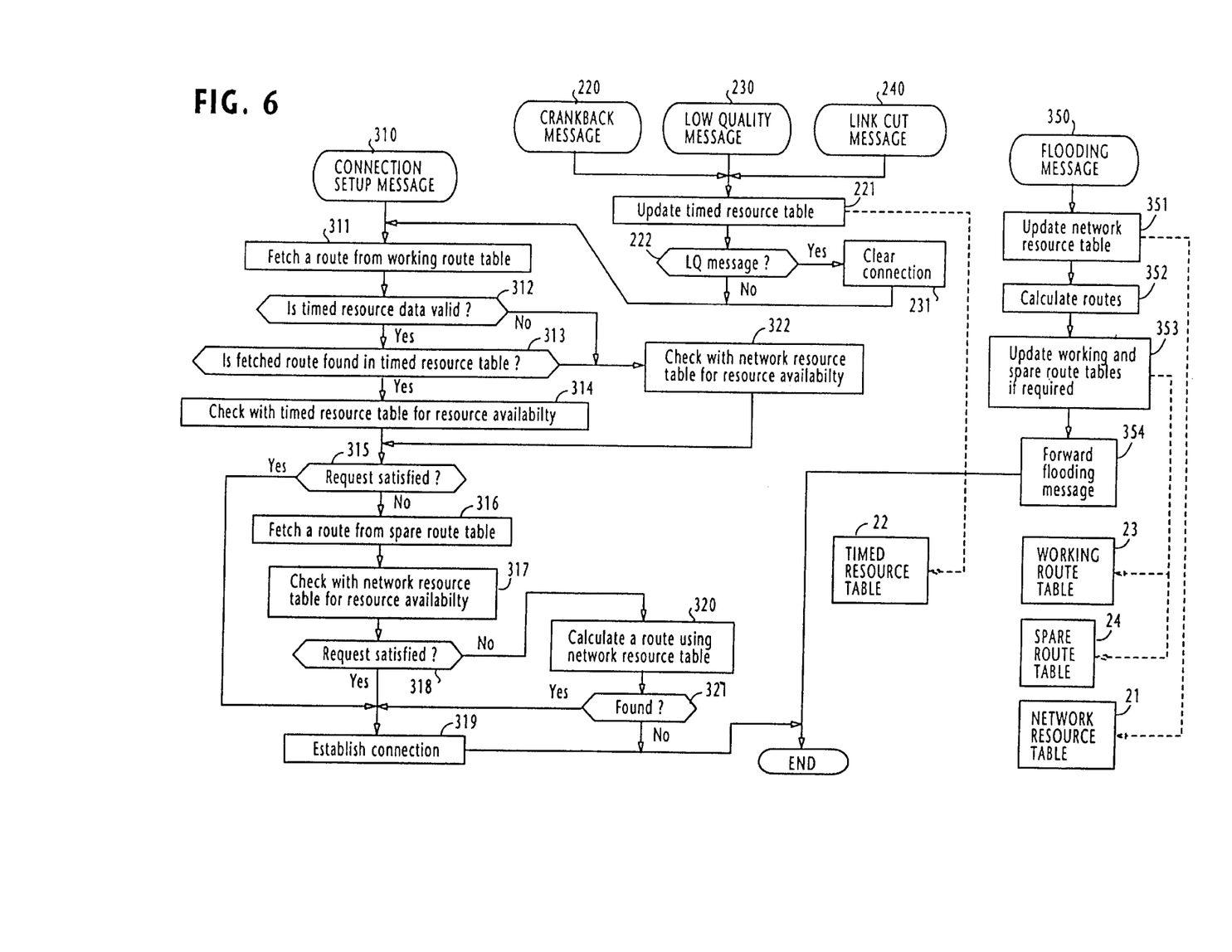
FIG. 6 is a flowchart of the operation of a source node according to a third embodiment of the present invention.

FIG. 6 shows a flowchart of the operation of the source node according to a third embodiment of this invention in which parts corresponding in significance to those in FIG. 4 are marked with the same numerals as those in FIG. 4, the description thereof being omitted for simplicity. In the third embodiment a working route table 23 and a spare route table 24 are provided.

When a connection setup message is received (step 310), the source node fetches a route from the working route table 23 (step 311) and checks to see if the data in the timed resource table 21 is valid or not (step 312). If it is valid, the source node proceeds to step 313 to determine whether the fetched route is found in the timed resource table 22. If so, flow proceeds to step 314 to check the user's requested QOS and/or bandwidth with the resource data in the timed resource table 22 for availability of the fetched working route and determines, at step 315, whether the request is satisfied. If the decision is affirmative at step 315, flow proceeds to step 319 to establish a connection via the fetched working route. If the decision at step 315 is negative, flow proceeds to step 316 to fetch a spare route from the spare route table 24 and checks the user's request with the data in the network resource table 21 for resource availability of the fetched spare route and determines, at step 318, whether the request is satisfied. If the decision at step 318 is affirmative, flow proceeds to the connection establishment step 319. Otherwise, the source node proceeds to step 320 to calculate a new route using the network resource table 21 and proceeds to the connection establishment step if an appropriate route is found (step 321). Otherwise, control proceeds to the end of the program.

If the decision at steps 312 and 313 is negative, the source node proceeds to step 322 to check the user's requested parameter with the network resource table 21 to determine the resource availability of the fetched working route at step 315.

The operation of the source node according to FIG. 6 will be understood with the following description by using the same assumptions as those in FIG. 4, i.e., the originating user terminal 8 sends a connection message destined for user terminal 9 requesting a bandwidth of 50 Mbps immediately after the source node 1 has received a crankback message indicating that the route via node 1 to node 2 has a bandwidth of only 20 Mbps. Example data stored in the working route table 23, spare route table 24, network resource table 21 and timed resource table 22 are shown in FIGS. 7A, 7B, 7C and 7D, respectively.

Figures 7A, 7B, 7C:
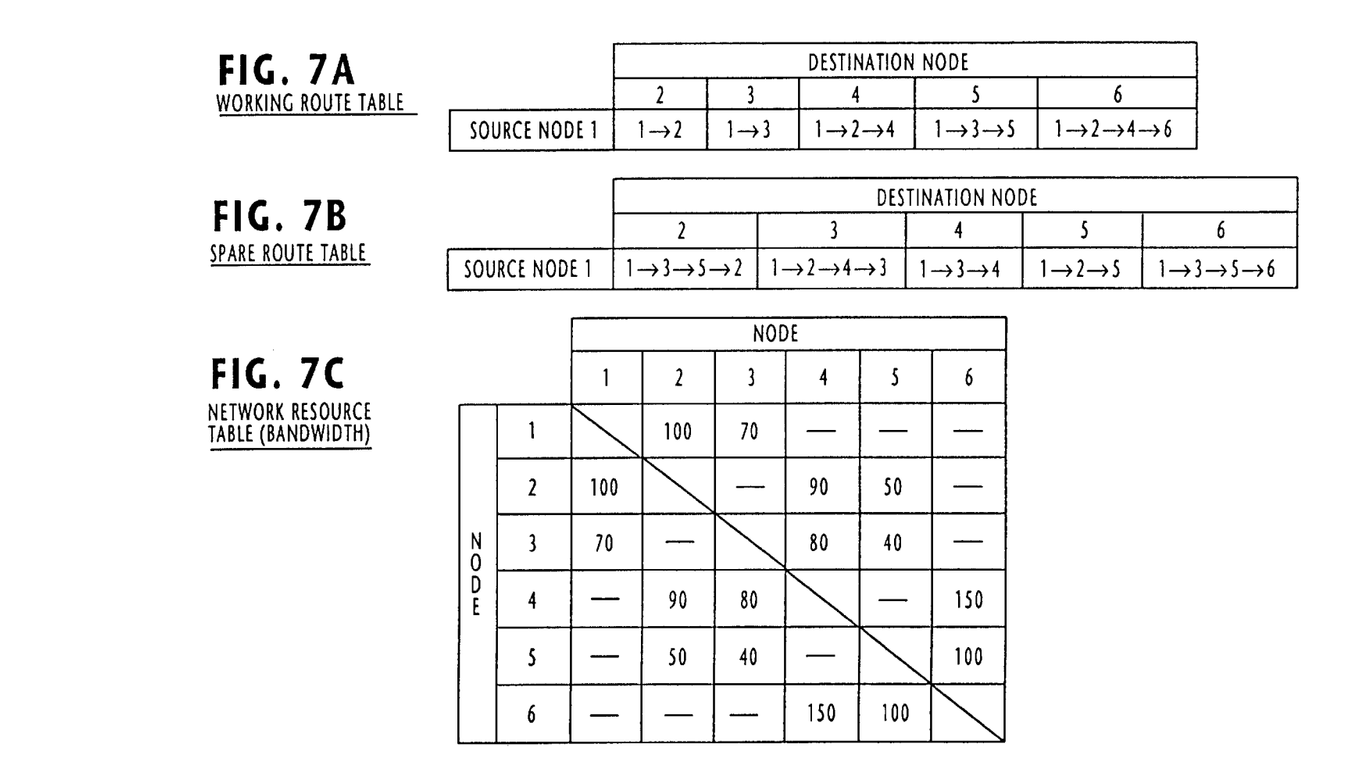
FIGS. 7A, 7B, 7C and 7D are illustrations of a working route table, a spare route table, a network resource table and a timed resource table respectively used in the third embodiment.
Figure 7D:
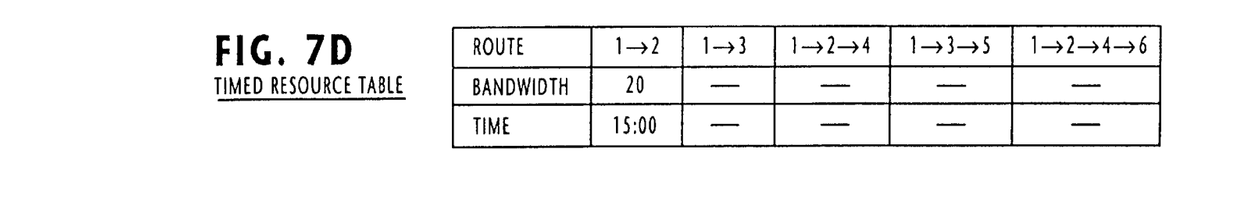

In response to the connection message, the source node 1 fetches, at step 311, the optimum route via node 1 to node 2 from the route table 20 (FIG. 7A). Since the data in the timed resource table 22 is valid (step 312) and the route from node 1 to node 2 will be found in the timed resource table 22 (step 313), the source node checks with the timed resource table for availability of the requested bandwidth (step 314). Since the available bandwidth of the fetched route is only 20 Mbps as indicated in FIG. 7D, the decision at step 315 is negative, and the source node fetches, at step 320, a spare route via nodes 1, 3, 5 and 2 from the spare route table 24 (FIG. 7B), and a resource availability test is applied to the fetched spare route (step 317). Since the requested 50 Mbps is not supported by the fetched spare route (FIG. 7C), the decision at step 318 is negative and a new route via nodes 1, 3, 4 and 2 that can support the 50 Mbps requirement will be calculated and control is directed down the affirmative decision branch from step 321 to the connection establishment step 319. If the bandwidth of the user's request is equal to or narrower than 20 Mbps, control will be directed down the affirmative decision branch from step 315 to the connection establishment step 319.

Figure 8:
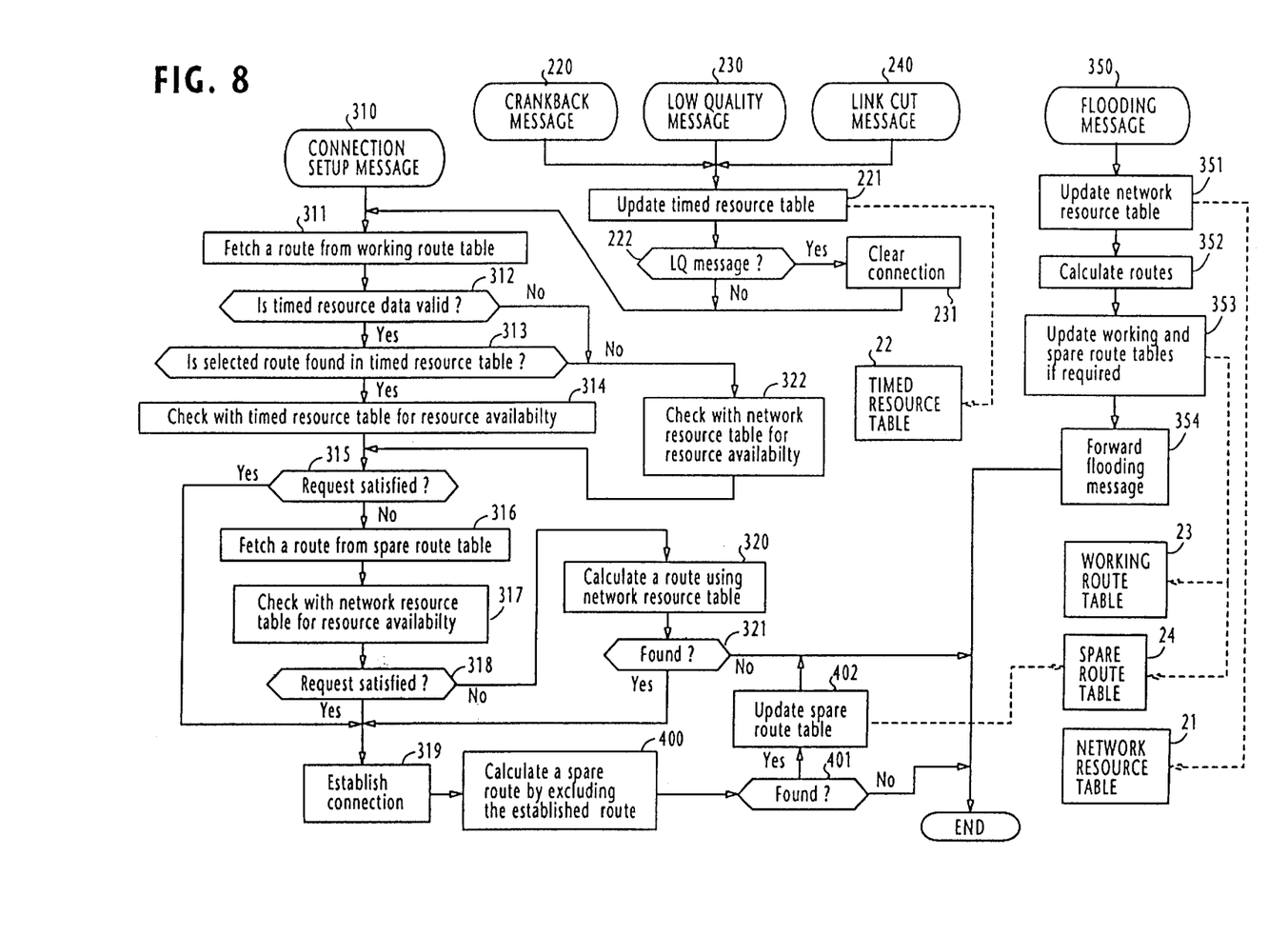
FIG. 8 is a flowchart of the operation of a source node according to a modified form of the third embodiment.

The embodiment of FIG. 6 is modified as shown in FIG. 8. In FIG. 8, when a connection is established at step 318, flow proceeds to step 400 to calculate a spare route using the network resource table 21 by excluding the route of the connection just established. If a spare route is found (step 401), the spare route table 24 is updated with the calculated route (step 402) before the program is terminated.

What is claimed is:

1. A source routing method for routing a call from a source node through a communication network in which a plurality of nodes are interconnected by communication links, wherein the source node is provided with a route table and a network resource table, said route table storing data of a plurality of routes from each of said nodes to other nodes of the network, and the network resource table storing data of available network resources of said links, the method of said source node comprising the steps of:

a) updating the network resource table in response to a first message received from the network whenever there is a change in the available network resources, said first message being flooded through the network to exchange most recent resource data among said nodes;

b) updating the network resource table in response to a second message from the network if said change in the available network resources occurs when a connection is being progressively established or already established from said source node, said second message arriving at said source node earlier than said first message;

c) fetching a route from said route table in response to a connection setup message from a user terminal;

d) comparing a requirement requested by the user terminal with resource data of the fetched route in the network resource table; and e) establishing a connection via the fetched route if the resource data of the fetched route in the network resource table indicates that the fetched route can support said requirement.

2. A source routing method as claimed in claim 1, further comprising the steps of determining a route using the network resource table if the resource data of said network resource table does not support requirement, and establishing a connection via the determined route.

3. A source routing method as claimed in claim 1, wherein said second message includes a crankback message which occurs when said requirement is not satisfied by at least one of the links of the connection being established from said source node, further comprising the steps of:

fetching a route from said route table in response to said crankback message; and repeating steps (d) and (e).

4. A source routing method as claimed in claim 1, wherein said second message includes a low quality message which occurs when said requirement is not satisfied by at least one of the links of the connection already established, further comprising the steps of:

clearing said already established connection in response to said low quality message;

fetching a route from said route table; and repeating steps (d) and (e).

5. A source routing method as claimed in claim 1, wherein said second message includes a link cut message which occurs when said requirement is not satisfied by at least one of the links of the connection already established from said source node, further comprising the steps of:

calculating routes using said network route table in response to said link cut message and updating the route table with the calculated routes;

fetching a route from said route table; and repeating steps (d) and (e).

6. A source routing method for routing a call from a source node through a communication network in which a plurality of nodes are interconnected by communication links, wherein the source node is provided with a route table, a network resource table and a timed resource table, said route table storing data of a plurality of routes from each of said nodes to other nodes of the network, the network resource table storing data of available network resources of said links, wherein contents of the timed resource table are valid for a predefined duration, the method of said source node comprising the steps of:

a) updating the network resource table in response to a first message received from the network whenever there is a change in the available network resources, said first message being flooded through the network to exchange most recent resource data among said nodes;

b) updating the timed resource table in response to a second message from the network if said change in the available network resources occurs when a connection is being progressively established or already established from said source node so that data of most recent resource of a route of the connection is installed in the timed resource table, said second message arriving at said source node earlier than said first message;

c) fetching a route from said route table in response to a connection setup message from a user terminal;

d) comparing a requirement requested by the user terminal with the resource data of the fetched route in the timed resource table if the valid contents of the timed resource table are relevant to the fetched route;

e) comparing said requirement with the resource data of the fetched route in the network resource table if the contents of the timed resource table are invalid or the valid contents of the timed resource table are irrelevant to the fetched route; and f) establishing a connection via the fetched route if the resource data of the fetched route in either the timed resource table or the network resource table indicates that the fetched route can support said requirement.

7. A source routing method as claimed in claim 6, further comprising the steps of determining a route using the network resource table if the resource data of both of said timed resource table and said network resource table do not support said requirement, and establishing a connection via the determined route.

8. A source routing method as claimed in claim 6, wherein said second message includes a crankback message which occurs when said requirement is not supported by at least one of the links of the connection being established from said source node, further comprising the steps of:

fetching a route from said route table in response to said crankback message; and repeating steps (d) to (f).

9. A source routing method as claimed in claim 6, wherein said second message includes a low quality message which occurs when said requirement is not supported by at least one of the links of the connection already established, further comprising the steps of:

clearing said already established connection in response to said low quality message;

fetching a route from said route table; and repeating steps (d) to (f).

10. A source routing method as claimed in claim 6, wherein said second message includes a link cut message which occurs when said requirement is not supported by at least one of the links of the connection already established from said source node, further comprising the steps of:

calculating routes using said network route table in response to said link cut message and updating the route table with the calculated routes;

fetching a route from said route table; and repeating steps (d) to (f).

11. A source routing method for routing a call from a source node through a communication network in which a plurality of nodes are interconnected by communication links, wherein the source node is provided with a working route table, a spare route table, a network resource table and a timed resource table, said working route table storing data of a plurality of working routes from each of said nodes to other nodes of the network, said spare route table storing a plurality of spare routes from each of said nodes to said other networks, the network resource table storing data of available network resources of said links, wherein contents of the timed resource table are valid for a predefined duration, the method of said source node comprising the steps of:

a) updating the network resource table in response to a first message received from the network whenever there is a change in the available network resources, said first message being flooded through the network to exchange most recent resource data among said nodes;

b) updating the timed resource table in response to a second message from the network if said change in the available network resources occurs when a connection is being progressively established or already established from said source node so that data of most recent resource of a route of the connection is installed in the timed resource table, said second message arriving at said source node earlier than said first message;

c) fetching a working route from said working route table in response to a connection setup message from a user terminal;

d) comparing a requirement requested by the user terminal with the resource data of the fetched working route in the timed resource table if the valid contents of the timed resource table are relevant to the fetched working route;

e) comparing said requirement with the resource data of the fetched working route stored in the network resource table if the contents of the timed resource table are invalid or the valid contents of the timed resource table are irrelevant to the fetched working route; and f) fetching a spare route from the spare route table if the resource data of both of said timed resource table and said network resource table indicates that the fetched working route does not support said requirement;

g) comparing said requirement with the resource data of the fetched spare route of the network resource table; and h) establishing a connection via the fetched working route if the resource data of the fetched working route in either the timed resource table or the network resource table indicates that the fetched working route cannot support said requirement, or via the fetched spare route if the resource data of the fetched spare route in the network resource table indicates that the fetched spare route can support said requirement.

12. A source routing method as claimed in claim 11, further comprising the steps of determining a route using the network resource table if the resource data of both of said fetched working route stored in said network resource table and the resource data of said fetched spare route stored in said network resource table do not support said requirement, and establishing a connection via the determined route.

13. A source routing method as claimed in claim 11, further comprising the steps of determining a spare route using said network resource table when said connection is established and updating said spare route table with the determined spare route.

14. A source routing method as claimed in claim 11, wherein said second message includes a crankback message which occurs when said requirement is not supported by at least one of the links of the connection being established from said source node, further comprising the steps of:

fetching a route from said route table in response to said crankback message; and repeating steps (d) to (h).

15. A source routing method as claimed in claim 11, wherein said second message includes a low quality message which occurs when said requirement is not supported by at least one of the links of the connection already established, further comprising the steps of:

clearing said already established connection in response to said low quality message;

fetching a route from said route table; and repeating steps (d) to (h).

16. A source routing method as claimed in claim 11, wherein said second message includes a link cut message which occurs when said requirement is not supported by at least one of the links of the connection already established from said source node, further comprising the steps of:

calculating routes using said network route table in response to said link cut message and updating the route table with the calculated routes;

fetching a route from said route table; and repeating steps (d) to (h).

17. A source routing method as claimed in claim 11, further comprising the steps of:

calculating routes in response to said first message by using the network resource table; and updating said working route table and said spare route table with the calculated routes.

* * * * *